United States Patent [19]

Arika et al.

[11] Patent Number: 4,562,055

[45] Date of Patent: Dec. 31, 1985

[54] PROCESS FOR PREPARATION OF ZEOLITES

[75] Inventors: Junji Arika, Tokuyama; Hiroshi Miyazaki, Shinnanyo; Kazushige Igawa, Shinnanyo; Keiji Itabashi, Shinnanyo, all of Japan

[73] Assignee: Toyo Soda Manufacturing Co., Ltd., Shinnanyo, Japan

[21] Appl. No.: 534,118

[22] Filed: Sep. 20, 1983

[30] Foreign Application Priority Data

Oct. 8, 1982 [JP] Japan ............................ 57-176077
Sep. 20, 1983 [JP] Japan ............................ 57-162123

[51] Int. Cl.$^4$ ............................................. C01B 33/28
[52] U.S. Cl. .................................... 423/329; 423/328
[58] Field of Search ........................... 423/328–329, 423/118; 502/60, 77

[56] References Cited

U.S. PATENT DOCUMENTS

| | | | |
|---|---|---|---|
| 3,574,539 | 4/1971 | Domine et al. | 423/328 |
| 3,933,974 | 1/1976 | Winquist | 423/329 |
| 3,966,883 | 6/1976 | Vaughan et al. | 423/328 |
| 4,017,590 | 4/1977 | Cormier et al. | 423/328 |
| 4,046,859 | 9/1977 | Plank et al. | 423/329 |
| 4,257,885 | 3/1981 | Grose et al. | 423/328 |

FOREIGN PATENT DOCUMENTS 1119962  7/1968  United Kingdom ............... 423/329

OTHER PUBLICATIONS

Kibby et al. "Journal of Catalyst", 35, 1974, pp. 256–277.

Primary Examiner—Edward J. Meros
Attorney, Agent, or Firm—Cushman, Darby & Cushman

[57] ABSTRACT

A zeolite similar to ZSM-5, having lattice spacings (d-values), shown in Table 1, of the X-ray powder diffraction pattern, and a ferrierite zeolite are prepared by crystallizing a homogeneous phase compound of a granular amorphous aluminosilicate in water or in an aqueous solution of an alkali metal hydroxide and/or an alkali metal silicate.

1 Claim, 4 Drawing Figures

X 1000

X 1000

PROCESS FOR PREPARATION OF ZEOLITES

BACKGROUND OF THE INVENTION (1) Field of the Invention

This invention relates to a process for the preparation of zeolites having 5-membered rings of oxygen atoms. More particularly, it relates to a process in which zeolites having 5-membered rings of oxygen atoms and having a high purity and a high $SiO_2/Al_2O_3$ molar ratio can easily be prepared with a good reproducibility without using an organic mineralizer.

(2) Description of the Prior Art

As is seen from the fact that the term "zeolite" is derived from the Greek word "zein" (boiling stone), the zeolite is a crystalline aluminosilicate containing zeolitic water, which has an oxide molar composition represented by the following general formula:

$$M_{2/n}O \cdot Al_2O_3 \cdot xSiO_2 \cdot yH_2O$$

wherein M stands for a metal cation, n stands for the valency of the metal cation M, x is a number of at least 2, and y is a number larger than 0.

The basic structure of the zeolite comprises $SiO_4$ tetrahedrons having four oxygen atoms at apexes with the silicon atom being as the center and $AlO_4$ tetrahedrons having four oxygen atoms at apexes with the aluminum atom being as the center, where these $SiO_4$ tetrahedrons and $AlO_4$ tetrahedrons are regularly and three-dimensionally connected to one another while owning oxygen atoms jointly. A three-dimensional network structure having pores differing in the size and shape according to the manner of connection of the tetrahedrons can be provided. Negative charges of the $AlO_4$ tetrahedrons are electrically neutralized by coupling with cations of an alkali metal or alkaline earth metal. The thus-formed pores have a size of 2 to 10 angstroms or more, and the pore size can be changed by exchanging the metal cations connected to the $AlO_4$ tetrahedrons with other metal cations having a different size.

The zeolite is widely used as a dehydrating agent for a gas or liquid or as a molecular sieve for adsorbing and separating specific molecules by utilizing the above-mentioned pores. Furthermore, the zeolite is used on an industrial scale as a catalyst by utilizing properties as the solid acid.

Various zeolites differing in the crystal structure and chemical composition are known, and the adsorbing properties, catalytic properties and ion-exchanging properties differ according to the differences of the crystal structure and chemical composition. Different names are given to these zeolites. Among these zeolites, mordenite, offretite, erionite, clinoptilolite and chabazite are naturally present, and they can also be obtained by the hydrothermal synthesis. Zeolites A, X and Y are not naturally present, but they are obtained only by the hydrothermal synthesis.

The zeolites prepared by the process of the present invention are classified into two types, one of which is similar to a ZSM-5 type and the other of which is a ferrierite type.

Zeolite ZSM-5 is formed by the hydrothermal synthesis using as an indispensable starting material an organic mineralizer such as tetrapropyl ammonium ion and is a crystalline aluminosilicate of the orthorhombic system having lattice constants of a=20.1 Å, b=19.9 Å and c=13.4 Å and having lattice spacings (d-values), shown in Table 1, of the X-ray powder diffraction pattern. In the crystal of this zeolite, tetrapropyl ammonium ion is present as a part of the cations constituting the crystal.

TABLE 1

| Lattice Spacing (d-value) | Relative Intensity |
|---|---|
| 11.1 ± 0.3 | Strong |
| 10.0 ± 0.3 | Strong |
| 7.4 ± 0.2 | Weak |
| 7.1 ± 0.2 | Weak |
| 6.3 ± 0.2 | Weak |
| 6.04 ± 0.2 | Weak |
| 5.56 ± 0.1 | Weak |
| 5.01 ± 0.1 | Weak |
| 4.60 ± 0.08 | Weak |
| 4.25 ± 0.08 | Weak |
| 3.85 ± 0.07 | Very strong |
| 3.71 ± 0.05 | Strong |
| 3.04 ± 0.03 | Weak |
| 2.99 ± 0.02 | Weak |
| 2.94 ± 0.02 | Weak |

Various processes have been proposed and disclosed as the improved process for the synthesis of ZSM-5 or a zeolite similar to ZSM-5. For example, a process using an organic sulfur compound as the organic mineralizer agent is disclosed in Japanese Unexamined Patent Publication No. 54-137,500, a process using a cyclic ether is disclosed in Japanese Unexamined Patent Publication No. 56-140,023, a process using an alcohol amine is disclosed in Japanese Unexamined Patent Publication No. 56-17,920, and a process using an amino acid is disclosed in Japanese Unexamined Patent Publication No. 56-7,817. In these processes, use of an organic mineralizer is indispensable. Recently, a trial has been made to synthesize a zeolite similar to ZSM-5 without using an organic mineralizer. For example, Japanese Unexamined Patent Publication No. 57-7,819 teaches a process in which the synthesis is carried out in the presence of a seed crystal synthesized in the presence of tetrapropyl ammonium bromide.

Furthermore, Japanese Examined Patent Publication No. 56-49,851 discloses a process in which a zeolite similar to ZSM-5 is synthesized in the absence of an organic mineralizer by using a silica sol as the silica source.

From the results of the research made by us, it was found that it is very difficult to synthesize a zeolite similar to ZSM-5 without using an organic mineralizer and this zeolite is not always synthesized at a high efficiency even when the synthesis is carried out faithfully according to the known processes. It also was found that the above zeolite cannot be synthesized unless reaction conditions such as the starting silica component, the mixing order of the starting materials, the stirring condition and the crystallization temperature are selected in a complicated manner. For example, it was found that in the case where a silica sol customarily used in this field is used as the silica source, if stirring is effected during the crystallization, a zeolite similar to ZSM-5 cannot be obtained even when the composition of the starting materials and the crystallization temperature are controlled in various manners. Furthermore, in most of experiments where stirring was effected only at the step of preparing the starting materials and heating was effected without stirring at the other steps, the product was amorphous or was composed mainly of mordenite. Exceptionally, formation of a zeolite similar to ZSM-5 was observed, but in this case, impurities such as mordenite were inevitably formed simultaneously with the zeolite.

A zeolite similar to ZSM-5 was obtained only when an aqueous solution of sodium silicate was used as the silica source, fine ZSM was added as a seed crystal and crystallization was effected under heating with stirring. However, mordenite and kenyaite were present as impurities in the product. Even if various experiments were performed without addition of a seed crystal by using an aqueous solution of sodium silicate as the silica source, the intended object could not be attained.

A ferrierite type zeolite naturally occurs, and its typical composition is represented as follows:

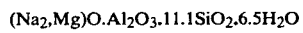

$(Na_2,Mg)O \cdot Al_2O_3 \cdot 11.1SiO_2 \cdot 6.5H_2O$

The crystal structure of this zeolite comprises 5-membered oxygen ring units constituting the skeleton and is characterized in that it has fine pores of 10-membered rings of oxygen atoms having a size of 4.3×5.5 Å and fine pores of 8-membered rings of oxygen atoms having a size of 3.4×4.8 Å.

Various processes as described below have been proposed as the process for synthesizing ferrierite type zeolites. However, an industrially satisfactory process has not been developed.

(1) In the process proposed by Mr. C. L. Kibby et al (Journal of Catalysis, Vol. 35, pages 256–272, 1974), a high temperature exceeding about 300° C. is necessary for crystallization, and therefore, a high-temperature high-pressure type reaction for crystallization, and therefore, a high-temperature high-pressure type reaction vessel should inevitably be used.

(2) In the process disclosed in Japanese Unexamined Patent Publication No. 51-106,700, the synthesis can be carried out at a relatively low temperature, but a starting silica-alumina material having a specific composition should be prepared and the presence of a potassium ion in the reaction system is indispensable. Moreover, addition of a mineralizer such as a sodium salt and/or potassium salt of an organic or inorganic polybasic acid is indispensable. Thus, in this process, selection of the starting material and setting of the reaction conditions are complicated, and the process is not advantageous from an industrial viewpoint.

(3) In the process disclosed in Japanese Unexamined Patent Publications No. 50-127,898 and No. 55-85,415, use of N-methylpyridine hydroxide and piperidine and/or an alkyl-substituted piperidine as an organic mineralizer is indispensable. These organic amines are expensive, and since these organic amines are included in the formed zeolite, when the ferrierite type zeolite obtained according to this process is used as an adsorbent or catalyst, it is necessary to calcine the synthesized zeolite at a high temperature of at least 500° C. in the presence of oxygen to remove the amines. Namely, when the zeolite is used for these specific purposes, the zeolite should be subjected to a preliminary treatment as described above.

(4) The process disclosed in Japanese Unexamined Patent Publication No. 53-144,500 is a process for synthesizing a ferrierite type zeolite called "ZSM-35", in which butanediamine or an organic base-containing cation derived therefrom is used. As is the above-mentioned process (3), the zeolite obtained by the synthesis should be subjected to a preliminary treatment before it is actually used in various fields.

It is known that in zeolites comprising 5-membered rings of oxygen atoms as the zeolite skeletone-constituting units, such as ferrierite, mordenite and ZSM-5, the $SiO_2/Al_2O_3$ molar ratio can be increased to a relatively high level. However, for the synthesis of these zeolites, it is ordinarily indispensable that an organic nitrogen-containing compound or other organic compound should be present in the reaction system, as pointed out hereinbefore. Furthermore, in these known processes, in order to enhance the activity of the reaction mixture, expensive aqueous colloidal silica is ordinarily used as the silica source.

SUMMARY OF THE INVENTION

We have made researches over a period of years on conditions for preparing crystalline aluminosilicate zeolites from the $M_{2/n}O-Al_2O_3-SiO_2-H_2O$ system (in which n stands for the valency of the cation M), especially selection of the silica source, alumina source and other starting materials, the conditions for preparation of the reaction mixture and the zeolite crystallization mechanism. As the result, we have succeeded in developing the process of the present invention which is fundamentally different from the above-mentioned known processes.

The primary object of the present invention is to provide a process in which a ferrierite type zeolite or a zeolite similar to ZSM-5, having a high purity and a high $SiO_2/Al_2O_3$ ratio is easily and efficiently prepared with good reproducibility by using cheap starting materials without using organic and inorganic mineralizers. In view of the fact that the conventional processes can be carried out on a bench scale but they are defective in the product quality and operation and are economically disadvantageous, it will be readily understood that the present invention has a great industrial significance.

In accordance with the present invention, there is provided a process for preparing a zeolite similar to ZSM-5, having lattice spacings (d-values), shown in Table 1, of the X-ray powder diffraction pattern, or a ferrierite zeolite, which comprises crystallizing a homogeneous phase compound of a granular amorphous aluminosilicate in water or in an aqueous alkali solution selected from the group consisting of an aqueous alkali metal hydroxide solution and an aqueous alkali metal silicate solution.

The zeolite similar to ZSM-5, characterized as having lattice spacings, shown in Table 1, of the X-ray powder diffraction pattern is prepared preferably by crystallizing a homogeneous phase compound of a granular amorphous alumino silicate containing aluminum in an amount of 0.5 to 10% by weight as calculated as anhydrous $Al_2O_3$ in an aqueous solution of an alkali metal hydroxide and/or an alkali metal silicate.

The ferrierite type zeolite is prepared preferably by crystallizing a homogeneous phase compound of a granular amorphous aluminosilicate containing aluminum in an amount of 3 to 15% by weight as calculated as anhydrous $Al_2O_3$ and an alkali metal in an amount of 0.4 to 17% by weight as calculated as anhydrous $A_2O$ (in which A stands for an alkali metal) in water or an aqueous alkali metal hydroxide solution.

DESCRIPTION OF THE PREFERRED EMBODIMENTS

Figure 1:
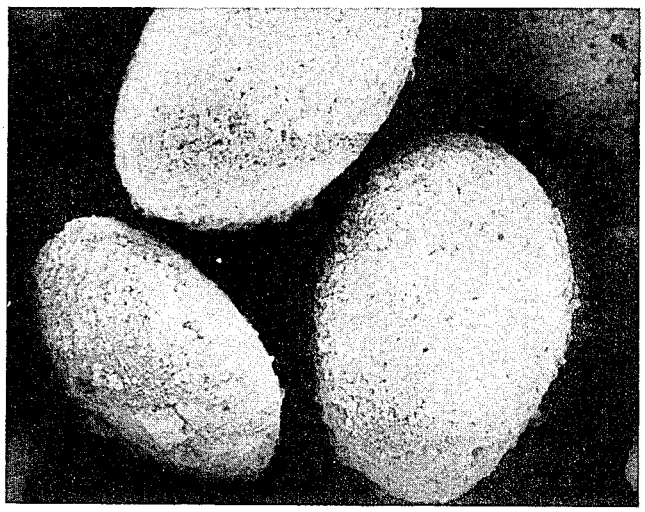
FIG. 1 is an electron microscope photograph of the granular homogeneous compound obtained in Example 6.

The manner whereby the specified homogeneous phase compound of a granular amorphous aluminosilicate is prepared is not particularly critical, but any of processes capable of providing such a homogeneous compound can be adopted. For example, this homogeneous compound can be prepared by reacting an aqueous alkali metal silicate solution simultaneously and continuously with an aqueous aluminum-containing solution. The process for the preparation of the homogeneous phase compound of a granular amorphous aluminosilicate will now be described with reference to this typical embodiment.

By the "simultaneous and continuous reaction" referred to in this embodiment is meant a reaction to be carried out in such a manner that the aqueous alkali metal silicate solution and the aqueous aluminum-containing solution are simultaneously supplied to a reaction zone while always maintaining substantially the same ratio.

As the aqueous solution of the alkali metal silicate, there can be used aqueous solutions of lithium silicate, sodium silicate and potassium silicate. As the aqueous aluminum-containing solution, there can be used aqueous solutions of aluminum sulfate, aluminum nitrate, aluminum chloride, sodium aluminate and potassium aluminate. If necessary, a caustic alkali or mineral acid may be added to these aqueous solutions so as to adjust the amount of the alkali or acid. A commercially available aqueous alkali metal silicate solution and a commercially available aqueous solution of a mineral acid salt of aluminum or an alkali metal aluminate may be used as the starting aqueous solutions. Furthermore, an aqueous solution formed by dissolving a silica source such as siliceous sand or hydrous solid silicic acid by a caustic alkali and an aqueous solution formed by dissolving an aluminum source such as aluminum hydroxide or activated alumina by a mineral acid or caustic alkali may be used. The concentrations of both the aqueous solutions are not particularly critical, but optional concentrations may be adopted.

According to one most preferred embodiment of the production of the homogeneous compound by the above-mentioned process, both the aqueous solutions are simultaneously and continuously supplied with stirring to an overflow type reaction vessel provided with a stirrer. The homogeneous compound obtained according to this embodiment takes a shape of substantially spherical particles or agglomerates of fine particles. When the particle size or agglomerate size of the majority of the particles or agglomerates is distributed in the range of from 1 to 500 microns and the fraction of fine particles or agglomerates having a size smaller than 1 micron is very small, especially good results can be obtained. In carrying out the present invention, it is especially preferred that a homogeneous compound having a particle or agglomerate size of 10 to 100 microns be used. The feed rates of both the aqueous solutions can optionally be determined according to the $SiO_2/Al_2O_3$ molar ratio of the intended zeolite. A slurry containing the homogeneous compound suspended therein is formed by the above reaction. The pH value of this slurry is adjusted by controlling the amounts of the alkali and acid to be added to both the aqueous solutions. It is ordinarily preferred that the pH value of the reaction slurry be adjusted to 5 to 9, more preferably 6 to 8. The residence time of the slurry in the reaction vessel is preferably at least 3 minutes. By the term "residence time" referred to herein is meant a period ranging from the point of the simultaneous and continuous supply of both the aqueous solutions to the reaction vessel to the point of the discharge of the reaction slurry containing the homogeneous compound formed by the reaction from the reaction vessel.

If the residence time is shorter than 3 minutes, the ratio of fine particles is increased. As described hereinafter, as the ratio of fine particles having a size smaller than 1 micron is increased, a larger load is imposed at the step of filtering for separating the formed compound. If the residence time is at least 3 minutes, the majority of formed particles are spherical particles and the proportion of fine particles is reduced. If the residence time is further prolonged, the particle size is increased, and the bonding among the particles becomes strong, resulting in increase of the hardness of the spherical particles. Accordingly, the size and hardness of the formed spherical particles can be varied by controlling the residence time, and the reactivity of the homogeneous compound per se can therefore be adjusted by controlling the residence time.

According to another embodiment of the present invention production of the homogeneous compound, there may be adopted a so-called batchwise continuous preparation method in which both the aqueous solutions are simultaneously and continuously supplied at a certain ratio with stirring to a reaction vessel without discharging a reaction slurry. In this embodiment, it is necessary that both the aqueous solutions should not be added promptly but the starting materials for one batch should be supplied over a period of at least 5 minutes, preferably at least 30 minutes.

The reaction temperature adopted for the production of the homogeneous compound is not particularly critical, and spherical particles are formed at either a lower temperature or a higher temperature and no substantial difference of the reactivity is caused by the difference of the reaction temperature.

It is to be noted that when the granular homogeneous compound obtained by reacting the aqueous solution of the alkali metal silicate simultaneously and continuously with the aluminum-containing aqueous solution is used as the starting material, a zeolite of an especially high-purity can be obtained, while if a pasty amorphous aluminosilicate compound obtained by adding one aqueous solution to the other aqueous solution according to a so-called batchwise reaction method is used as the starting material, the intended high purity zeolite cannot be obtained even when the crystallization is carried out under the same conditions. Furthermore, if both the aqueous solutions having adjusted concentrations are simultaneously and continuously reacted at a constant ratio, the composition of the formed spherical homogeneous compound is microscopically completely uniform irrespectively of the size of the formed spherical particles, and therefore, formation of impurities as by-products due to the non-uniform composition can be avoided.

Furthermore, if the reaction is carried out by adding one aqueous solution to the other aqueous solution according to the so-called batchwise method, the viscosity of the reaction slurry is abnormally increased and even if strong stirring is effected, it is impossible to render the formed slurry homogeneous. Even if the slurry is sufficiently mixed to be rendered homogeneous in appearance, microscopic non-uniformity of the composition cannot be avoided. When the amorphous aluminosilicate compound obtained according to the batchwise method is used as the starting material, it is impossible to obtain the intended zeolite, and this is due to the non-uniformity of the composition. This is the reason why the granular amorphous aluminosilicate compound is called "homogeneous phase compound" in the present invention. Moreover, in the batchwise method, since the above-mentioned pasty reaction product has a very high viscosity, the concentration of the effective ingredient is inevitably limited to a very low level. In contrast, since the homogeneous compound of the present invention consists of spherical particles having a size of 1 to 500 microns, the viscosity of the reaction slurry is very low and strong stirring required in the batchwise method need not be effected, and the concentration of the reaction slurry can be greatly increased.

The homogeneous compound prepared according to one typical embodiment is obtained in the form of spherical particles having an appropriate size and solid-liquid separation and washing can be performed very easily. This is another characteristic feature of the present invention. Accordingly, an ordinary centrifugal separator or vacuum filter can be adopted for solid-liquid separation. Moreover, since the dehydrating property is very good and the homogeneous compound is obtained in the form of a wet cake having a low water content, in preparing a reaction mixture for crystallization to the intended zeolite, the amount of water can be set within a very broad range. It is preferred that the washed homogeneous compound be used in the form of a wet cake. Of course, however, the homogeneous compound may be used after drying.

In general, the mixing ratio of the ingredients of the starting material is important for preparing a pure zeolite free of impurities.

In the above-mentioned embodiment of the present invention, the composition of the homogeneous compound is determined by the conditions for the reaction between the aqueous alkali metal silicate solution and the aluminum-containing aqueous solution and the washing, filtering and drying conditions.

Various homogeneous compounds differing in the composition can be prepared according to the above-mentioned processes. However, when the zeolite similar to ZSM-5, having lattice spacings, shown in Table 1, of the X-ray powder diffraction pattern is prepared, the homogeneous compound used preferably contain aluminum in an amount of 0.5 to 10% by weight as calculated as anhydrous $Al_2O_3$. A homogeneous compound having a relatively low $Al_2O_3$ content is preferred for obtaining a zeolite having a high $SiO_2/Al_2O_3$ ratio. In contrast, a homogeneous compound having a relatively high $Al_2O_3$ content is preferred for obtaining a zeolite having a low $SiO_2/Al_2O_3$ ratio. However, if the $Al_2O_3$ content (as calculated in the anhydrous state) of the homogeneous compound is lower than 0.5% by weight or higher than 10% by weight, the intended zeolite similar to ZSM-5 cannot be obtained.

Homogeneous compounds having an $Al_2O_3$ content in the range of from 0.5 to 10% by weight (as calculated in the anhydrous state) can be prepared by adjusting the flow rates of both the aqueous solutions while taking the concentrations of $SiO_2$ and $Al_2O_3$ into consideration. For example, a homogeneous compound having a relatively high $Al_2O_3$ content is obtained by increasing the $Al_2O_3$ concentration or flow rate of the aluminum-containing aqueous solution.

When the ferrierite type zeolite is prepared, the homogeneous compound used preferably contain aluminum in an amount of 3 to 15% by weight as calculated as anhydrous $Al_2O_3$ and an alkali metal in an amount of 0.4 to 17% by weight as calculated as anhydrous $A_2O$. It is more preferable that the aluminum content be 5 to 14% by weight, especially 6 to 10% by weight, as $Al_2O_3$, and the alkali metal content be 1 to 12% by weight, especially 1.5 to 10% by weight, as $A_2O$. If a homogeneous compound having an anhydrous $Al_2O_3$ content lower than 3% by weight is used, other zeolites are formed as impurities in large quantities. If the anhydrous $Al_2O_3$ content exceeds 15% by weight, a ferrierite type zeolite is not formed. If the alkali metal content is outside the above-mentioned range, the obtained product contains large quantities of impurities.

Solid-liquid separation of the reaction slurry having the homogeneous compound suspended therein can be accomplished very easily, and a homogeneous compound having a high dehydration ratio can ordinarily be obtained by a customary filtration operation. It is one of economical advantages of the present invention that aqueous dilute solutions can be used as the starting materials for the synthesis of zeolites. When the homogeneous compound is subjected to crystallization, the homogeneous compound may be used either in the wet state or in the dry state.

Crystallization is effected by heating the homogeneous compound in water or in the aqueous alkli solution. Stirring at the crystallizing step is not an indispensable condition, but in order to conduct heat uniformly in the crystallization system, stirring is preferred.

Crystallization into the ferrierite type zeolite is preferably carried out in water or an aqueous alkali metal hydroxide solution. In preparing a starting slurry for crystallization by adding a predetermined amount of a homogeneous compound having a known composition to water or an aqueous alkali metal hydroxide solution, the concentration and amount of the alkali metal hydroxide should be adjusted so that the homogeneous compound will be crystallized into a high-purity ferrierite type zeolite.

As the aqueous solution of the alkali metal hydroxide to be used for crystallization of the homogeneous compound into the ferrierite type zeolite, there can be mentioned aqueous solutions of sodium hydroxide, potassium hydroxide and lithium hydroxide. These alkali metal hydroxides may be used either alone or in combination. The concentration of the aqueous solution of the alkali metal hydroxide is adjusted according to the aluminum content in the homogeneous compound as indicated below.

| | Applicable Range (% by weight) | Preferred Range (% by weight) | More Preferred Range (% by weight) |
|---|---|---|---|
| Aluminum Content (as Al₂O₃) in Homogeneous Compound | 3–15 | 5–14 | 6–10 |
| Concentration of Aqueous Solution of Alkali Metal Hydroxide (AOH) | 0–12 | 0–8 | 0–7 |

Incidentally, in the above table, A stands for an alkali metal and AOH stands for an alkali metal hydroxide.

Most preferred conditions for obtaining a ferrierite type zeolite having a high purity and a high crystallinity are such that the concentration of the aqueous solution of the alkali metal hydroxide is adjusted within the above-mentioned range, the molar ratio of the whole alkali metal hydroxide component as AOH in the starting slurry for crystallization to the aluminum component as Al$_2$O$_3$ in the homogeneous compound is adjusted within a range of from 2 to 4 and the molar ratio of the alkali metal hydroxide component as AOH to the silicon component as SiO$_2$ in the homogeneous compound is adjusted to not more than 0.2. Furthermore, the amount of the aqueous alkali metal hydroxide solution is adjusted so that the weight ratio of the solid to the whole starting slurry for crystallization is within a range of from 0.04 to 0.4.

As pointed out hereinbefore, the homogeneous compound obtained according to the typical preferred embodiment has a relatively large particle size and a high hardness. Accordingly, the homogeneous compound is not finely divided even under stirring. Therefore, the amount of water in the starting slurry can be reduced without formation of impurities and without drastic increase of the viscosity of the slurry, and hence, the yield in the batchwise reaction can remarkably be increased. This is still another characteristic feature of the present invention. The crystallization into the ferrierite type zeolite is effected by charging a starting homogeneous compound-containing slurry for crystallization in an autoclave and heating the slurry at a temperature of 100° to 300° C., preferably 150° to 300° C. In order to uniformalize the temperature in the autoclave during the crystallization, it is preferred that the crystallization be carried out with stirring. After completion of the crystallization, the formed crystal is separated from the mother liquor, wahsed with water and dried to obtain a crystal powder. The obtained crystal particles retain substantially the same particle size as that of the spherical particles of the starting homogeneous compound. Namely, the obtained product is an aggregate of crystal particles of a granular ferrierite type zeolite having a particle size of about 1 to about 500 microns.

Crystallization into the zeolite similar to ZSM-5 is preferably carried out in an aqueous solution of an alkali metal hydroxide and/or an alkali metal silicate. As the aqueous solution, there are preferably used aqueous solutions of sodium hydroxide, potassium hydroxide, lithium hydroxide, sodium silicate, potassium silicate and lithium silicate. These alkali metal compounds may be used either alone or in combination. Aqueous solutions of sodium hydroxide and sodium silicate and mixtures thereof are especially preferred.

It is preferred that in the aqueous alkali solution, the AOH concentration (in which A stands for an alkali metal) be 0.5 to 5% by weight and the SiO$_2$ concentration be 0 to 10% by weight, and an AOH concentration of 1 to 5% by weight is especially preferred. If the AOH concentration exceeds 5% by weight, impurities, especially mordenite, are formed. If the AOH concentration is lower than 5% by weight, crystallization becomes difficult. Furthermore, if the SiO$_2$ concentration is higher than 10% by weight, crystallization is not caused to occur. Incidentally, the mother liquor obtained at the step of solid-liquid separation conducted after completion of the crystallization may be used as the aqueous alkali solution, and use of this mother liquor is preferred from the economical viewpoint.

The ratio between the homogeneous compound and the aqueous alkali solution to be subjected to the crystallization is not particularly critical. However, it is preferred that the aqueous alkali solution be used in an amount of 20 to 2,000 parts by weight per 100 parts by weight (wet base) of the homogeneous compound.

The crystallization temperature is preferably 120° to 220° C. At a temperature lower than 120° C., the crystallization is difficult, and at a temperature higher than 220° C., mordenite and quartz are formed. The crystallization time is ordinarily in the range of from 10 to 200 hours, though the suitable crystallization time varies depending upon the crystallization temperature.

After completion of the crystallization, the slurry is subjected to solid-liquid separation, water washing and drying to obtain a high-purity zeolite similar to ZSM-5, which has d-values of the X-ray powder diffractometry shown in Table 1.

d-Values of a typical product obtained according to the process of the present invention are shown in Table 2. In the X-ray powder diffractometry, the d-values and relative intensities vary to some extent depending upon the zeolite preparation conditions and measurement conditions. Accordingly, the values shown in Table 2 are not critical.

TABLE 2

| Lattice Spacing (d-value) (Å) | Relative Intensity |
|---|---|
| 11.1 Å | 52 |
| 10.0 | 35 |
| 9.8 | 18 |
| 7.4 | 5 |
| 6.7 | 7 |
| 6.4 | 11 |
| 6.02 | 13 |
| 5.71 | 11 |
| 5.59 | 11 |
| 4.98 | 8 |
| 4.62 | 7 |
| 4.37 | 11 |
| 4.27 | 15 |
| 4.09 | 6 |
| 4.01 | 9 |
| 3.85 | 100 |
| 3.81 | 73 |
| 3.75 | 43 |
| 3.72 | 53 |
| 3.64 | 33 |
| 3.60 | 7 |
| 3.49 | 11 |
| 3.44 | 24 |
| 3.36 | 14 |
| 3.32 | 20 |
| 3.25 | 7 |
| 3.20 | 11 |
| 3.05 | 15 |
| 2.99 | 14 |
| 2.98 | 16 |
| 2.94 | 8 |

The zeolite similar to ZSM-5, obtained according to the process of the present invention, is characterized in that doublets appear at 10.0 Å and 9.8 Å, 3.85 Å and 3.81 Å, 3.75 Å and 3.72 Å, and 2.99 Å and 2.98 Å. This feature becomes more conspicuous the higher the $SiO_2/Al_2O_3$ ratio. The composition of this zeolite is represented by the following formula:

$$xNa_2O.Al_2O_3.(15-100)SiO_2.yH_2O$$

wherein x is about 1 though the value differs to some extent according to the degree of water washing of the product, and y is 0 or a positive number though the value differs according to the degree of drying or dehydration.

The zeolites obtained according to the process of the present invention, have a high $SiO_2/Al_2O_3$ ratio in the range of from 15 to 100. Furthermore, these zeolites exhibit a characteristic adsorption. Namely, these zeolites have a high adsorption for benzene but a relatively low adsorption for cyclohexane. This tendency becomes more conspicuous the higher the $SiO_2/Al_2O_3$ molar ratio. For example, in the case where the $SiO_2/Al_2O_3$ molar ratio is 45, the adsorption for benzene is 9.6% by weight and the adsorption for cyclohexane is 2.2% by weight (25° C., 46 mmHg). In the case where the $SiO_2/Al_2O_3$ molar ratio is 22, the adsorption for benzene is 13.8% by weight and the adsorption for cyclohexane is 7.5% by weight (25° C., 46 mmHg). The zeolites are ion-exchanged with an appropriate cation according to known procedures in the powdery state or after calcination and molding. The ion-exchanged zeolites can be utilized as a dehydrating agent, an adsorbing separator or a catalyst in the form of the crystal aggregate or after fine pulverization, or after molding together with a binder.

The present invention will now be described in detail with reference to the following Examples.

PREPARATION OF HOMOGENEOUS AND HETEROGENEOUS COMPOUNDS

An aqueous solution of sodium silicate and a sulfuric acid-added aqueous solution of aluminum sulfate, each having a composition shown in Table 3, were continuously supplied at rates of 1.5 l/hr and 0.5 l/hr, respectively, to an overflow type reaction vessel (having an actual capacity of 1 liter) kept in a stirring state. The apparent residence time of the reaction slurry was 30 minutes, the reaction temperature was 30° to 32° C., and the pH value of the overflowing slurry was 6.3 to 6.6.

The discharged slurry was subjected to solid-liquid separation by a centrifugal filter, and the recovered solid was sufficiently washed with water to obtain a wet cake A, B, C, D or E of a homogeneous compound having a composition shown in Table 3. $SO_4^{2-}$ was not detected in the homogeneous compound. From the results of the X-ray powder diffractometry, it was confirmed that each homogeneous compound was amorphous.

A heterogeneous compound F was prepared by adding 2 liters of the same aqueous solution of aluminum sulfate as used for the formation of the homogeneous compound C to 6 liters of the same aqueous solution of sodium silicate as used for the formation of the homogeneous compound C. A heterogeneous compound G was prepared by adding 6 liters of the same aqueous solution of sodium silicate as used for the formation of the homogeneous compound C to 2 liters of the same aqueous solution of aluminum sulfate as used for the formation of the homogeneous compound C.

Solid-liquid separation of the slurry and water washing were carried out in the same manner as described above with reference to the homogeneous compounds. The compositions of the obtained heterogeneous compounds are shown in Table 3. From the results of the X-ray powder diffractometry, it was confirmed that each heterogeneous compound was amorphous.

TABLE 3

| | Aqueous Solution of Sodium Silicate | | | | Aqueous Solution of Aluminum Sulfate | | | Composition (% by weight) of Amorphous Aluminosilicate | | | | |
|---|---|---|---|---|---|---|---|---|---|---|---|---|
| | $SiO_2$ (g/l) | $Na_2O$ (g/l) | $Al_2O_3$ (g/l) | Flow rate | $Al_2O_3$ (g/l) | $SO_4$ (g/l) | Flow rate | $Na_2O$ (dry base) | $Al_2O_3$ (dry base) | $SiO_2$ (dry base) | $H_2O$ (wet base) | Remarks |
| A | 250 | 82 | 2.75 | 1.5 l/hr | 1.0 | 372 | 0.5 l/hr | 1.4 | 1.20 | 97.7 | 60.4 | homogeneous compound |
| C | " | " | " | " | 17.3 | 357 | " | 2.8 | 2.91 | 95.7 | 67.5 | homogeneous compound |
| D | " | " | " | " | 42.7 | 333 | " | 3.9 | 5.85 | 90.1 | 59.2 | homogeneous compound |
| E | " | " | " | " | 12.7 | 254 | " | 8.6 | 13.2 | 74.5 | 63.5 | homogeneous compound |
| F | " | " | " | 6 l | 17.3 | 357 | 2 l | 3.7 | 2.45 | 95.5 | 59.8 | heterogeneous compound |
| G | " | " | " | " | " | " | " | 2.2 | 3.05 | 94.1 | 61.3 | heterogeneous compound |
| B | " | " | " | 1.5 l/hr | 8.75 | 365 | 0.5 l/hr | 2.0 | 2.05 | 96.3 | 62.5 | homogeneous compound |

EXAMPLES 1 THROUGH 4 AND COMPARATIVE EXAMPLES 1 THROUGH 5

The wet cake of the homogeneous or heterogeneous compound, obtained in the above-mentioned manner, and an aqueous alkali solution were charged in an autoclave having a capacity of 2 liters, and the charge was heated with stirring. The formed slurry having a reaction product suspended therein was taken out from the autoclave, subjected to solid-liquid separation, sufficiently washed with water and then dried at 120° C. The crystallization conditions and obtained results are shown in Table 4.

EXAMPLE 5

Figure 4:
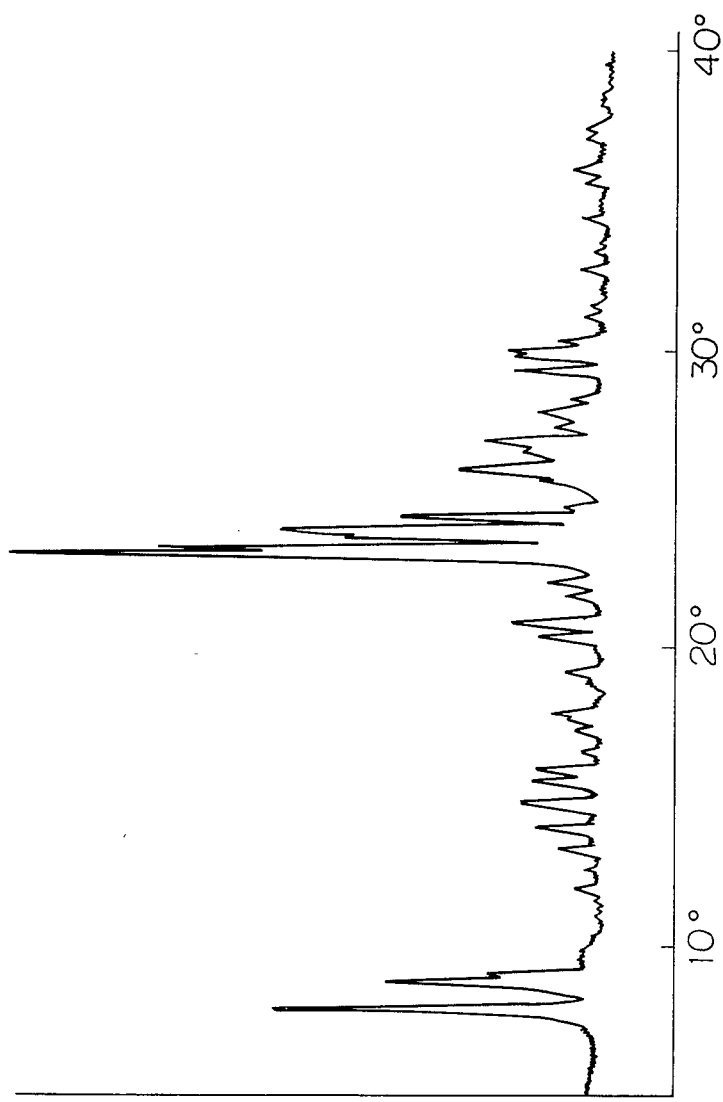
FIG. 4 is an X-ray powder diffraction pattern diagram of the product obtained in Example 1, as determined by using a Kα double of copper.

The homogeneous compound B and an aqueous solution of sodium hydroxide having an NaOH concentration of 3.60% by weight were charged in an autoclave having a capacity of 10 liters. The charge was heated at 165° C. for 2 hours to obtain a zeolite similar to ZSM-5, which had a high purity and an $SiO_2/Al_2O_3$ ratio of 58.8. The crystallization conditions and obtained results are shown in Table 4. The X-ray powder diffraction pattern of the zeolite is shown in FIG. 4.

sured in a McBain-Bakr type spring balance. It was found that the n-hexane adsorption was 7.9% by weight

TABLE 4

| | Homogeneous or Heterogeneous Compound | | Aqueous Alkali Solution | | | Crystallization Conditions | | |
|---|---|---|---|---|---|---|---|---|
| | | Amount (g) | NaOH (% by weight) | SiO$_2$ (% by weight) | Amount (g) | Temperature (°C.) | Time (hours) | Product |
| Example 1 | A | 805 | 4.86 | 0 | 795 | 170 | 72 | Zeolite similar to ZSM-5 |
| Example 2 | C | 901 | 4.86 | 0 | 699 | 198 | 18 | Zeolite similar to ZSM-5 |
| Example 3 | D | 608 | 1.30 | 0 | 992 | 160 | 72 | Zeolite similar to ZSM-5 |
| Comparative Example 1 | E | 763 | 1.30 | 0 | 836 | 160 | 72 | Mordenite |
| Comparative Example 2 | F | 901 | 4.86 | 0 | 699 | 198 | 18 | Amorphous |
| Comparative Example 3 | G | 901 | 4.86 | 0 | 699 | 198 | 18 | Zeolite similar to ZSM-5 (containing large quantity of mordenite) |
| Comparative Example 4 | C | 901 | 8.0 | 0 | 699 | 160 | 72 | Mordenite, etc. |
| Comparative Example 5 | C | 901 | 0 | 0 | 699 | 160 | 72 | Amorphous |
| Example 4 | C | 901 | 4.80 | 1.57 | 699 | 160 | 72 | Zeolite similar to ZSM-5 |
| Example 5 | B | 3,830 | 3.60 | 0 | 4,170 | 165 | 72 | Zeolite similar to ZSM-5 |

EXAMPLE 6

A sulfuric acid-acidified aqueous solution of aluminum sulfate, (Al$_2$O$_3$=44.4 g/l, H$_2$SO$_4$=256.9 g/l) and an aqueous solution of sodium silicate (Na$_2$O=65.6 g/l, SiO$_2$=200.0 g/l, Al$_2$O$_3$=2.2 g/l) were simultaneously and continuously supplied at feed rates of 0.25 l/hr and 0.75 l/hr, respectively, to an overflow type reaction vessel provided with an ordinary paddle agitator, and they were reacted with stirring. An overflow opening of the reaction vessel was arranged so that 0.5 liter of the reaction liquid (slurry) was always present in the reaction vessel and the excessive slurry overflowed from the reaction vessel. The residence time of the reaction slurry was thus adjusted to 30 minutes. The pH value of the slurry was 6.2 and the reaction temperature was 32° C.

The product slurry overflowing from the reaction vessel was subjected to solid-liquid separation by a centrifugal separator, and the recovered solid was washed with water until SO$_4{}^{2-}$ ion was not detected in the washing filtrate, whereby a homogeneous compound having a composition shown in Table 5 was obtained. An electron microscope photograph of this homogeneous compound is shown in FIG. 1.

Then, 355.6 g of the thus-obtained homogeneous compound was added to 505 g of an aqueous solution of sodium hydroxide having a concentration of 0.89% by weight, and the mixture was stirred to form a starting slurry.

Figure 2:
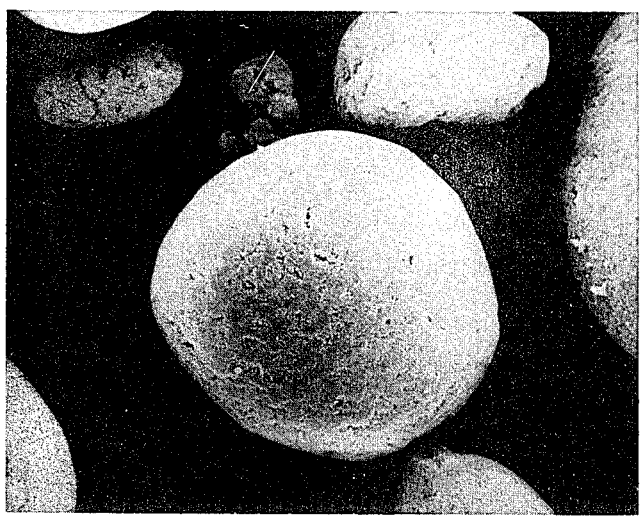
FIG. 2 is an electron microscope photograph of the product obtained in Example 6.
Figure 3:
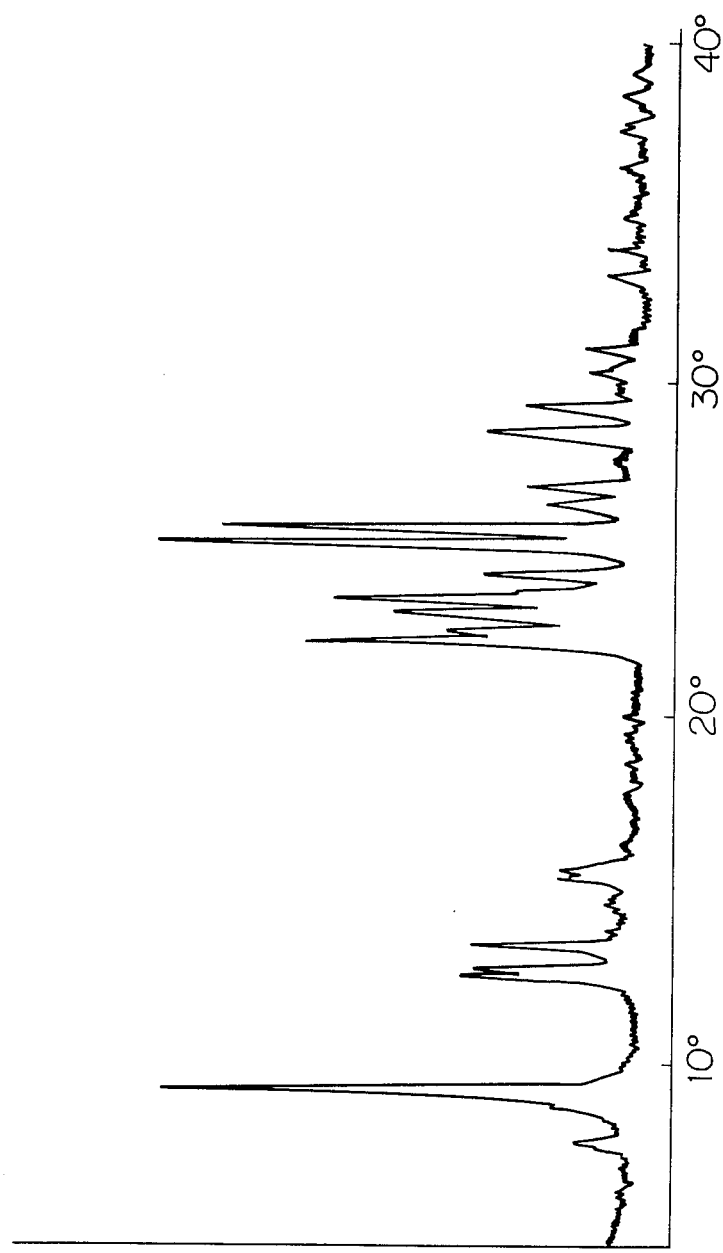
FIG. 3 is an X-ray powder diffraction diagram of the product obtained in Example 6, as determined by using a Kα doublet of copper.

The starting slurry was charged in an autoclave and maintained at 180° C. under the autogeneous pressure for 72 hours to effect crystallization. After completion of the reaction, the formed solid was separated from the mother liquor by filtration, washed with water and then dried at 110° C. An electron microscope photograph (1000 magnifications) of the product and an X-ray powder diffraction diagram of the product are shown in FIGS. 2 and 3, respectively. From the results of the chemical analysis, it was found that the obtained product had the following composition on the anhydrous base:

1.0Na$_2$O.Al$_2$O$_3$.19.3SiO$_2$

A part of the sample was activated at 350° C. in vacuo for 2 hours and the absorption of n-hexane was measured at 25° C. under 95 mmHg.

EXAMPLE 7

To 297 g of an aqueous solution of sodium hydroxide having a concentration of 0.71% by weight was added 209.2 g of the homogeneous compound obtained in Example 6, and the mixture was stirred to form a stirring slurry.

This slurry was charged in an autoclave and maintained at 180° C. under the autogeneous pressure for 72 hours to effect crystallization. After completion of the reaction, the formed solid was separated from the mother liquor by filtration, washed with water and then dried at 110° C. The X-ray powder diffraction diagram of the product was substantially the same as that of FIG. 3. From the results of the chemical analysis, it was found that the sample had the following composition on the anhydrous base:

1.0Na$_2$O.Al$_2$O$_3$.19.5SiO$_2$

In a McBain-Bakr type spring balance, a part of the sample was activated at 350° C. in vacuo for 2 hours and the adsorption of n-hexane was measured. It was found that the n-hexane adsorption was 6.6% by weight as measured at 25° C. under 95 mmHg.

EXAMPLE 8

A homogeneous compound having a composition shown in Table 5 was prepared substantially in the same manner as described in Example 6. Then, 895 g of this homogeneous compound was incorporated in 1,247 ml of water and the mixture was stirred to obtain a starting slurry. The slurry was maintained at 190° C. under the autogeneous pressure for 75 hours to effect crystallization. After completion of the reaction, the formed solid was separated from the mother liquor by filtration, washed with water and dried at 110° C. The X-ray powder diffraction diagram of the product was substantially the same as that of FIG. 3.

COMPARATIVE EXAMPLE 6

In 536 g of water was dissolved 72.2 g of aluminum sulfate (Al$_2$O$_3$=16.80% by weight, H$_2$SO$_4$=48.45% by weight), and 24.7 g of 97% concentrated sulfuric acid was added to the solution. Then, 527.8 g of water glass No. 3 ($SiO_2$=28.46% by weight, $Na_2O$=9.34% by weight, $Al_2O_3$=0.117% by weight) was added to the resulting aqueous solution with stirring. After completion of the addition, the mixture was further stirred for 30 minutes to form a reaction mixture. This reaction mixture was charged in an autoclave and maintained at 180° C. under the autogeneous pressure for 72 hours to effect crystallization.

After completion of the reaction, the formed solid was separated from the mother liquor by filtration, washed with water and then dried at 110° C. From the results of the X-ray powder diffractometry, it was found that the product was mordenite containing α-quartz.

COMPARATIVE EXAMPLE 7

To 1 liter of a sulfuric acid-acidified aqueous solution of aluminum sulfate ($Al_2O_3$=48.5 g/l, $H_2SO_4$=256.5 g/l) was added 3 liters of an aqueous solution of sodium silicate ($SiO_2$=200 g/l, $Na_2O$=65.6 g/l, $Al_2O_3$=0.82 g/l) with stirring. After completion of the addition, the mixture was further stirred to effect reaction.

The formed slurry product was subjected to solid-liquid separation by a centrifugal separator, and the recovered solid was washed with water until $SO_4^{2-}$ ion was not detected in the washing filtrate. The product was amorphous sodium aluminosilicate having a composition shown in Table 5.

To 484 g of an aqueous solution of sodium hydroxide having a concentration of 0.93% by weight was added 590 g of the thus-obtained amorphous sodium aluminosilicate, and the mixture was stirred to form a starting slurry.

The slurry was charged in an autoclave and maintained at 180° C. under the autogeneous pressure for 72 hours to effect crystallization. After completion of the reaction, the formed solid was separated from the mother liquor by filtration, washed with water and then dried at 110° C. From the results of the X-ray powder diffractometry, it was found that the product was an amorphous solid.

TABLE 5

| | Composition (% by weight) of Amorphous Aluminosilicate | | | |
|---|---|---|---|---|
| | $Na_2O$ (dry base) | $Al_2O_3$ (dry base) | $SiO_2$ (dry base) | $H_2O$ (wet base) |
| Examples 6 and 7 | 5.2 | 7.13 | 87.7 | 59.7 |
| Example 8 | 6.6 | 7.48 | 85.9 | 61.9 |
| Comparative Example 7 | 5.1 | 7.22 | 87.6 | 71.1 |

We claim:

1. A process for preparing a zeolite having an X-ray powder diffraction pattern with the lattice spacings (d-values) shown in Table 1, which process comprises the steps of:
  (1) supplying an aqueous sodium silicate solution simultaneously and continuously with an aqueous aluminum-containing solution with stirring or agitation in an overflow reaction vessel such that the residence time of any portion of the reaction slurry in the reaction vessel is at least three minutes and the pH of the overflowing reaction slurry having the reaction product suspended therein is maintained at a value of 5 to 9 to obtain a slurry comprising a homogeneous phase compound of a granular amorphous aluminosilicate which is composed of, on the dry base, 1.2 Ato 5.9% by weight of aluminum calculated as anhydrous $Al_2O_3$, 1.4 to 3.9% by weight of sodium calculated as anhydrous $Na_2O$ and the balance of silicon calculated as an hydrous $SiO_2$, and which is substantially spherical particles or an agglomerate of fine particles, said particles having a size of from 1 to 500 microns;
  (2) subjecting said slurry to solid-liquid separation to obtain the granular amorphous aluminosilicate; and
  (3) crystallizing said granular amorphous aluminosilicate at a temperature in the range of about 120° to 220° C. in an aqueous alkali solution selected from the group consisting of an aqueous sodium hydroxide solution and an aqueous sodium silicate solution, said aqueous alkali solution consisting of water, 1 to 5% by weight of sodium hydroxide and 0 to 10% by weight of $SiO_2$, the amount of said aqueous alkali solution being 20 to 2,000 parts by weight per 100 parts by weight of the granular amorphous aluminosilicate.

* * * * *

UNITED STATES PATENT AND TRADEMARK OFFICE
CERTIFICATE OF CORRECTION

PATENT NO. : 4,562,055
DATED : DECEMBER 31, 1985
INVENTOR(S) : ARIKA et al

It is certified that error appears in the above–identified patent and that said Letters Patent are hereby corrected as shown below:

Page 1, Foreign Application Priority Data, Line 2:
"Sep. 20, 1983" should be -- Sep. 20, 1982 --.

Column 16, Line 27: "Ato" should be -- to --.

Signed and Sealed this

Thirtieth Day of December, 1986

Attest:

DONALD J. QUIGG

Attesting Officer      Commissioner of Patents and Trademarks